United States Patent [19]
Bisberg

[11] 3,913,740
[45] Oct. 21, 1975

[54] FOLDER FOR OVERHEAD PROJECTOR AND EASEL USE

[76] Inventor: Aaron M. Bisberg, P.O. Box 14, North Station, White Plains, N.Y. 10603

[22] Filed: Apr. 5, 1973

[21] Appl. No.: 348,368

[52] U.S. Cl. ............... 206/472; 40/106.1; 353/120; 353/35; 206/454
[51] Int. Cl.² ...................... B65D 5/52; G03B 21/00
[58] Field of Search ........ 206/45.21, 472, 473, 474, 206/454; 248/441; 40/106.1; 353/122, 35, 120

[56] References Cited
UNITED STATES PATENTS

| | | | |
|---|---|---|---|
| 1,955,252 | 4/1934 | Palla | 206/45.21 |
| 2,030,996 | 2/1936 | Lustig | 206/45.21 |
| 3,056,230 | 10/1962 | Brokaw, Jr. | 248/441 |
| 3,561,862 | 2/1971 | Albee, Jr. | 353/122 |
| 3,709,590 | 1/1973 | Bisberg | 353/35 |

*Primary Examiner*—William T. Dixson, Jr.
*Attorney, Agent, or Firm*—Burgess, Dinklage & Sprung

[57] ABSTRACT

A folder for the storage of transparencies and for their use in overhead projection and easel arrangement comprising a rectangular cover leaf, a plurality of independent transparencies, means pivotally joining said cover leaf and said transparencies along one edge so as to be pivotable about said edge, a pair of enclosure leaves integral with the edges of said cover leaf adjacent said pivotally mounted edge of said leaf, said enclosure leaves on their edges adjacent said pivotal joinder being tapered so as to be capable of forming an easel for the inclined cover leaf in one opened position. The enclosure leaves are provided with a tab and slot arrangement for interengagement to close the folder. The pivotal joining means may comprise a spiral wire winding along which holes are aligned for engagement with positioning pins of an overhead projector; the opposite edge is provided with aligned holes for putting the folder in a loose-leaf binder.

6 Claims, 4 Drawing Figures

FIG. 1.
FIG. 2.
FIG. 3.
FIG. 4.
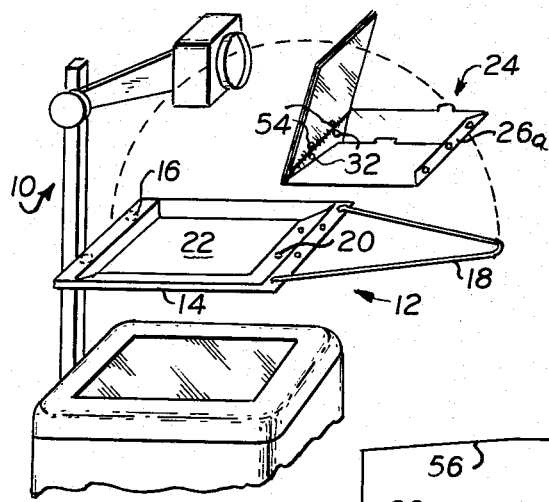
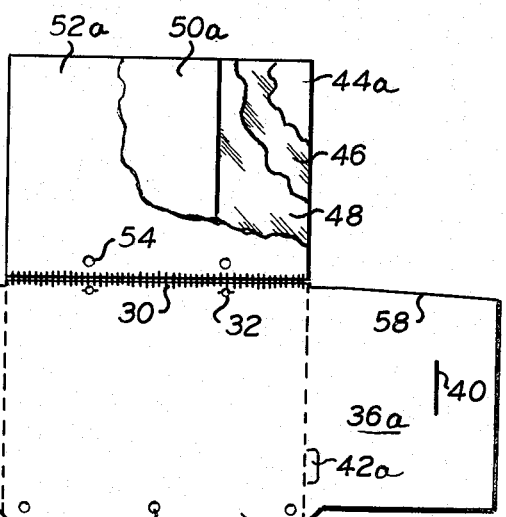
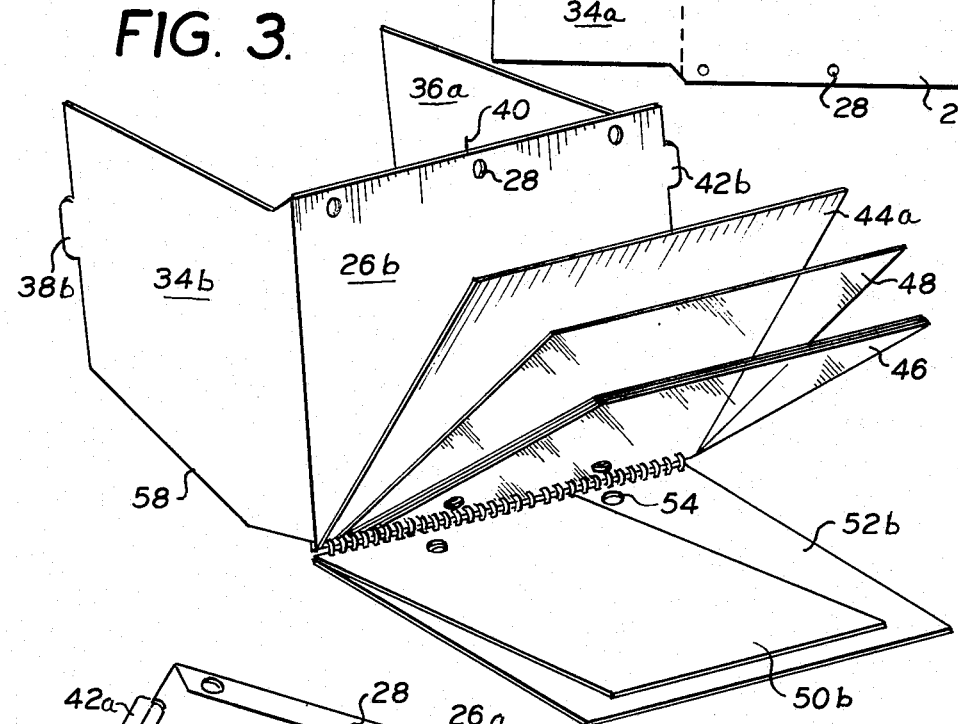
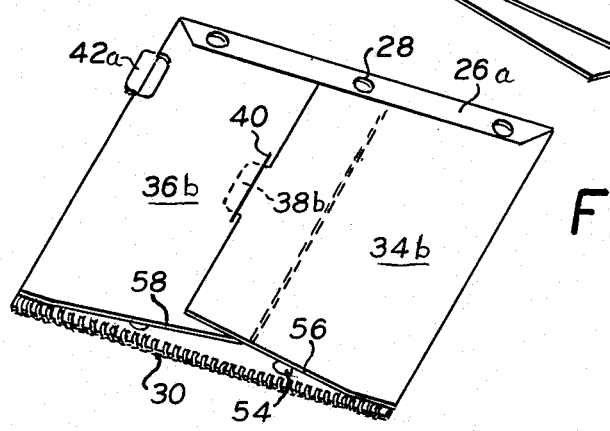

FOLDER FOR OVERHEAD PROJECTOR AND EASEL USE

The present invention relates to an educational folder for the storage of transparencies and for their use in overhead projection and easel arrangement.

For educational purposes and commercial presentations overhead projectors have gained wide acceptance so that the lecturer can have his material projected for a large audience to see. Folders have been provided with appropriate fold-outs having textual matter printed thereon as notes for the lecturer, as described in my U.S. Pat. No. 3,709,590 for example.

These are quite satisfactory but do not deal with those situations where the student is to work alone, without projection.

It is accordingly an object of the present invention to provide a folder for visual presentations which may be used as a desk by one student as an easel arrangement.

These and other objects and advantages are realized in accordance with the present invention pursuant to which there is provided a folder for the storage of transparencies and for their use in overhead projection and easel arrangement comprising a rectangular cover leaf, a plurality of independent transparencies, means pivotally joining said cover leaf and said transparencies along one edge so as to be pivotable about said edge, a pair of enclosure leaves integral with the edges of said cover leaf adjacent said pivotally mounted edge of said leaf, said enclosure leaves on their edges adjacent said pivotal joinder being tapered so as to be capable of forming an easel for the inclined cover leaf in one opened position. The enclosure leaves are provided with a tab and slot arrangement for interengagement to close the folder. The pivotal joining means may comprise a spiral wire winding along which holes are aligned for engagement with positioning pins of an overhead projector; the opposite edge is provided with aligned holes for putting the folder in a loose-leaf binder.

The invention will now be described more fully with reference to the accompanying drawings wherein:

FIG. 1 is an exploded perspective view showing the relationship of an overhead projector to the novel folder with an intermediary coupler;

FIG. 2 is a plan view of the opened folder;

FIG. 3 is a perspective view of the folder arranged for non-projection presentation and individual study with its self-contained easel; and FIG. 4 is a perspective view of the closed folder.

Referring now more particularly to FIG. 1, there is shown an overhead projector 10 and a coupler 12 to be used therewith. The coupler 12 includes a frame 14, a device for rigid connection to the projector such as suction cup 16 or any other grasping device and a folder support 18. The coupler 12 incorporates an indexing system including two pairs of pins 20 for registry with holes of the folder. Finally, the coupler includes an opening 22 or a transparent material permitting the transmission of light.

The folder 24 comprises a rectangular cover leaf 26 provided along one long edge with holes 28 for a loose-leaf binder (not shown). At the opposite edge it is joined by spiral winding 30 to a plurality of transparencies and overlays described more fully hereinafter. Along such edge the leaf 26 is provided with a pair of holes 32 which are provided with cross-hair slits so that they will snugly engage pins 20. For ease of understanding, the outside of leaf 26 in the various figures is identified as 26a. This applies also to the other elements whose other face is identified by the suffix b so the arrangement can more readily be followed.

The short edges of leaf 26 are joined to and integral with enclosure leaves 34, 36 which are provided with tab 38 and slot 40, respectively, for interengagement to close the folder as in FIG. 4. The leaf 26 is also provided with a tab 42 struck out of leaf 36. The tab 42 can be used for marking so that the contents of the folder will be recognized even if the folder is closed as in FIG. 4 and in a loose-leaf binder.

Also hinged on spiral winding 30 are other elements including a protective sheet 44 which can serve as a reflection board in certain uses. There are also a plurality of transparencies 46, 48, a partial opaque mask 50 and a full opaque sheet 52. Each of sheets 44, 46, 48, 50 and 52 is provided with two holes 54 slightly larger than holes 32 and pins 20 so as to go on and come off the pins easily.

It can be seen that one edge of each of enclosure leaves 34, 36 is cut back so as to expose holes 28 by which the folder is held in a loose-leaf binder; the cutbacks of the leaves are at the right in FIG. 1, the bottom in FIG. 2 and at the top in FIGS. 3 and 4. In addition, the width of sheets 44, 46, 48, 50 and 52 is such that they do not reach holes 28. Alternatively, the leaves need not be cut back but then they would also have to be provided with holes 28 for engagement with the rings of the loose-leaf binder.

Finally, the opposite edges of leaves 34 and 36 are specially shaped. They are slightly cut back near leaf 26 so as to clear spiral 30 and then they are tapered as at 56, 58, respectively. Thus, when the folder is in the position shown in FIG. 3 with the base of the structure defined by edges 56 and 58 and spiral 30, leaf 26 inclines rearwardly and forms an easel.

Sheet 52 may be relatively heavy since it is the first sheet which will fold against the easel and thus may serve as a weight or stabilizing influence. Textual matter may be provided on leaves 34a and 36a so as to be visible to the operator during projection.

The system operates as follows: For projection viewing the folder of FIG. 4 is opened and laid out as in FIG. 1. The enclosure leaves 34 and 36 may be open as in FIG. 2 to read their textual matter or they may be reengaged as shown in FIG. 1 after pivoting out the various leaves of the folder. The leaf 26 fits snugly on one pair of pins 20 so the folder is secure but the holes 54 are loose about the other pair of pins 20 so as to be easily pivoted. The sheets are laid one over the other or after a sheet is shown the folder is lifted, the sheet turned under, the folder replaced and the next sheet is shown.

When used for individual study the physical setup is as in FIG. 3 and the sheets can be raised or lowered one at a time.

The various opaque sheets can be made of cardboard or filled plastic while the transparent sheets can be made of any suitable material.

It will be appreciated that the instant specification and examples are set forth by way of illustration and not limitation, and that various modifications and changes may be made without departing from the spirit and scope of the present invention.

What is claimed is:

1. A folder for the storage of transparencies in a loose-leaf binder and for their use in overhead projection and easel arrangement comprising a rectangular cover leaf, a plurality of independent transparencies, means pivotally joining said cover leaf and said transparencies along one edge so as to be pivotable about said edge, and a pair of enclosure leaves integral with the edges of said cover leaf adjacent said pivotally mounted edge of said cover leaf, said enclosure leaves on their edges adjacent said pivotal joinder being tapered so as to be capable of forming an easel for the inclined cover leaf in one opened position, said cover leaf and transparencies being provided with holes aligned along said one edge, the holes of said transparencies being slightly larger than the holes of said cover leaf whereby said cover leaf can snugly engage positioning pins of an overhead projector coupler whereas said transparencies can be relatively freely mounted on said pins, said cover leaf including a tab projecting along the edge by which it is joined to one of said enclosure leaves, said tab being struck out of said one enclosure leaf, and said cover leaf being provided with holes aligned along the edge opposite said one edge, said holes being adapted to engage the rings of a loose-leaf binder.

2. A folder according to claim 1, including interengageable means on said pair of enclosure leaves so as to be capable of enclosing said transparencies between said cover leaf and enclosure leaves.

3. A folder according to claim 1, including a protective overlay on top of said transparencies, pivotally mounted about one edge and joined to said cover leaf and said transparencies by said pivotally joining means.

4. A folder according to claim 1, including at least one mask joined to said cover leaf and said transparencies by said pivotally joining means.

5. A folder according to claim 1, including a tab projecting from said cover leaf along the edge by which said cover leaf is joined to one of said enclosure leaves, said tab being struck out of said one enclosure leaf.

6. A folder according to claim 1, including a protective overlay on top of said transparencies and at least one mask, said overlay and mask being joined to said cover leaf and said transparencies by said pivotally joining means, said pair of enclosure means being provided with interengageable means so as to be capable of enclosing said transparencies between said cover leaf and enclosure leaves.

* * * * *